United States Patent
Ciezki et al.

(10) Patent No.: US 8,033,095 B2
(45) Date of Patent: Oct. 11, 2011

(54) DRIVE DEVICE ON THE BASIS OF A GEL-TYPE PROPELLANT AND METHOD FOR CONVEYING PROPELLANT

(75) Inventors: Helmut Konrad Ciezki, Neckarsulm (DE); Klaus Madlener, Hohentengen (DE); Oskar Haidn, Niedernhall (DE)

(73) Assignee: Deutsches Zentrum fuer Luft-und Raumfahrt e.V., Cologne (DE)

(*) Notice: Subject to any disclaimer, the term of this patent is extended or adjusted under 35 U.S.C. 154(b) by 194 days.

(21) Appl. No.: 12/005,651

(22) Filed: Dec. 27, 2007

(65) Prior Publication Data

US 2009/0165437 A1 Jul. 2, 2009

Related U.S. Application Data

(63) Continuation of application No. PCT/EP2006/005925, filed on Jun. 21, 2006.

(30) Foreign Application Priority Data

Jun. 30, 2005 (DE) .......................... 10 2005 030 437

(51) Int. Cl.
*F02K 9/00* (2006.01)
(52) U.S. Cl. ........................................ 60/252; 60/203.1
(58) Field of Classification Search ............... 60/39.461, 60/39.464, 203.1, 252, 736; 44/265
See application file for complete search history.

(56) References Cited

U.S. PATENT DOCUMENTS

| | | | |
|---|---|---|---|
| 3,032,979 A | 5/1962 | Corbett | |
| 3,046,736 A | 7/1962 | Thomson | |
| 3,732,693 A * | 5/1973 | Chu | .............................. 60/207 |
| 4,673,782 A | 6/1987 | Koepke et al. | |
| 5,133,183 A | 7/1992 | Asaoka et al. | |
| 5,152,136 A | 10/1992 | Chew et al. | |
| 5,357,088 A | 10/1994 | Suzuki et al. | |
| 5,636,513 A * | 6/1997 | Pahl | .............................. 60/204 |
| 6,591,753 B1 * | 7/2003 | Schmid et al. | ................ 102/205 |
| 7,138,960 B2 * | 11/2006 | Carroll et al. | .................. 343/882 |
| 2003/0217504 A1 * | 11/2003 | Merdjan et al. | .................. 44/267 |

FOREIGN PATENT DOCUMENTS

| | | |
|---|---|---|
| DE | 199 17 672 | 10/2000 |
| JP | 09195854 | 7/1997 |
| JP | 10252560 | 9/1998 |
| JP | 11315753 | 11/1999 |

(Continued)

OTHER PUBLICATIONS

H.K. Ciezki, et al., "An Overview of Investigations on Gel Fuels for Ramjet Applications", International Symposium on Airbreathing Engines, ISABE2005, Munich, Sep. 2005, 12 pages.

(Continued)

*Primary Examiner* — Louis Casaregola
*Assistant Examiner* — Andrew Nguyen
(74) *Attorney, Agent, or Firm* — Lipsitz & McAllister, LLC

(57) ABSTRACT

In order to make a drive device available on the basis of a gel-type propellant, in particular, for a flying object, comprising at least one tank for gel-type propellant, a combustion chamber and a device for supplying propellant to the combustion chamber, which is of a simple construction it is suggested that at least one radiation impinging device be provided for acting on gel-type propellant with electromagnetic radiation and/or at least one heating device for heating gel-type propellant in order to improve the flow behavior.

10 Claims, 4 Drawing Sheets

FOREIGN PATENT DOCUMENTS

WO 9526467 10/1995

OTHER PUBLICATIONS

H.K. Ciezki, et al., "Theoretical Approaches on the Influence of Non-linear Material Properties of Gel Propellants on the Flow in Injectors", 33$^{rd}$ International Annual Conference of ICT, Karlsruhe, 2002, 11 pages.

B. Nathan, et al., "The Status of Gel Propellants in Year 2000", Combustion of Energetic Materials, K. Kuo and L. deLuca, Editors, Begell House, Boca Roton, 2001, 24 pages.

* cited by examiner

DRIVE DEVICE ON THE BASIS OF A GEL-TYPE PROPELLANT AND METHOD FOR CONVEYING PROPELLANT

This application is a continuation of International application No. PCT/EP2006/005925 filed on Jun. 21, 2006.

The present disclosure relates to the subject matter disclosed in International application No. PCT/EP2006/005925 of Jun. 21, 2006 and German application No. 10 2005 030 437.0 of Jun. 30, 2005, which are incorporated herein by reference in their entirety and for all purposes.

BACKGROUND OF THE INVENTION

The invention relates to a drive device on the basis of a gel-type propellant, in particular, for a flying object, comprising at least one tank for gel-type propellant, a combustion chamber and a device for supplying propellant to the combustion chamber.

The invention relates, in addition, to a method for conveying propellant in a drive device.

U.S. Pat. No. 5,133,183 A discloses a drive system, with which a gel-type oxidizing agent is used.

U.S. Pat. No. 3,032,979 discloses a rocket motor which is driven by means of a gelatin-like mono-fuel.

Gel-type propellants and their applications are described in the articles "An Overview of Investigations on Gel Fuels for Ramjet Applications" of H. K. Ciezki and B. Natan, International Symposium on Airbreathing Engines, ISABE 2005, Munich, designated for publication in September 2005, "Theoretical Approaches on the Influence of Non-linear Material Properties of Gel Propellants on the Flow in Injectors" of H. K. Ciezki et al., $33^{rd}$ International Annual Conference of ICT, Karlsruhe, 2002 or "The Status of Gel Propellants in Year 2000" of B. Natan and S. Rahimi in Combustion of Energetic Materials, Editors K. K. Kuo, L. deLuca, Boca Raton, 2001.

Gel-type propellants have the advantage that they are solid under normal conditions and are flowable when subjected to shear stress. A controllable drive device may be made available on account of these properties. In comparison therewith, solid propellants can be stored and are easy to handle but the combustion can no longer be stopped after ignition and, normally, corresponding engines can also not be regulated. Hydraulic engines, on the other hand, can be regulated but their sensitivity with respect to leakages is very great and considerable resources are required with respect to conveyance. The positive characteristics of solid fuel and hydraulic drives can be combined by drive devices on the basis of gel propellants.

SUMMARY OF THE INVENTION

In accordance with the invention, a drive device is provided which is of a simple construction.

In accordance with the invention, the drive has at least one radiation impinging device for acting on gel-type propellant with electromagnetic radiation and/or has at least one heating device for heating gel-type propellant in order to improve the flow behavior.

Gel-type propellants display a non-Newtonian flow behavior, i.e., the shear viscosity is dependent on shear rates and the stain viscosity (expansion viscosity) is dependent on stain rates. In accordance with the invention, a radiation impinging device and/or heating device is provided, via which the shear viscosity and/or stain viscosity of the propellant can be reduced by way of a non-mechanical input of energy. As a result, its flow behavior is improved. The conveyance of the propellant, the jet disintegration and, in certain circumstances, also its vaporization and combustion can be optimized. As a result, preparation of the fuel and/or preparation of the oxidizing agent can be optimized, on the other hand, in order to bring about an optimized combustion control. The reduction in the stain viscosity becomes relevant, for example, in the case of tube constrictions.

As a result of the reduction in viscosity, conveyance of the propellant with lower conveying pressures may be achieved. As a result, the overall mass of the application (such as, for example, of a flying object) can be reduced. The tank can, for example, be designed, in particular, with a thinner wall thickness. As a result, the propellant consumption may, on the other hand, be reduced or greater ranges can be achieved. Drive devices with small dimensions, such as, for example, for an ejection seat, can also be made available.

As a result of the radiation impingement and/or heating (in particular, direct thermal heating or induction heating), the temperature in the gel-type propellant can be increased in order to reduce its viscosity. As a result of radiation impingement via electromagnetic radiation, bonds in the skeleton of the gel forming agent can also be broken up with a corresponding selection of frequency in order to reduce the viscosity.

As a result of radiation impingement, an input of energy from outside may be carried out without contact and directly. As a result, a reduction in viscosity may be achieved within short provision times and within a short period of time. As a result, application forerunning times may, on the other hand, be reduced. For example, radiation impingement takes place immediately prior to or during the start of an application, such as, for example, of a flying object.

It is, for example, possible for a carrier for the flying object to make the energy available for the radiation impingement or heating of the gel-type propellant. The carrier can, itself, be mobile and, in particular, itself be a flying object. The carrier can also be stationary.

It is, in principle, also possible for the energy generating device for making the energy available for the radiation impingement or heating of the gel-type propellant to be arranged in the flying object.

In the case of the gel-type propellant, this can be a gel-type fuel and/or a gel-type oxidizing agent. It may also be a combination of various fuels, of which at least one is gel-like or a combination of various oxidizing agents, of which at least one is gel-like.

It is favorable when at least one radiation impinging device and/or at least one heating device is associated with the at least one tank. As a result, the viscosity may be reduced in a corresponding, large volume area of gel-type propellant. This, on the other hand, makes it possible to reduce the conveying pressure for the conveyance of propellant to the combustion chamber.

The at least one radiation impinging device and/or at least one heating device is, in particular, arranged on the at least one tank. As a result, radiation impingement or heating of gel-type propellant in the tank may be achieved in a simple manner. In this respect, the entire volume of the tank can be acted upon by radiation or heated or only a partial area.

Furthermore, it is favorable when at least one radiation impinging device and/or at least one heating device is associated with one or several supply conduits from the at least one tank to the combustion chamber. As a result, the conveyance from the tank to the combustion chamber is made easier.

As a result, propellant, which has improved atomization and vaporization properties, can also be supplied to the combustion chamber.

At least one radiation impinging device and/or at least one heating device is, in particular, arranged at one or several supply conduits from the at least one tank to the combustion chamber. As a result, the viscosity of propellant guided in the at least one supply conduit can be reduced in a simple manner.

It may also be provided for at least one radiation impinging device and/or at least one heating device to be associated with an area for injecting propellant into the combustion chamber. As a result, the viscosity of propellant injected into the combustion chamber may be reduced. As a result, the atomization behavior and the vaporization behavior and, associated therewith, the combustion behavior may be optimized.

At least one radiation impinging device and/or at least one heating device is, in particular, arranged at an area for injecting propellant into the combustion chamber in order to facilitate an input of energy into the gel-type propellant for the purpose of reducing the viscosity.

The at least one radiation impinging device and/or at least one heating device is favorably designed such that a volume area of gel-type propellant can be acted upon with electromagnetic radiation and/or heated up. As a result, the viscosity in the gel-type propellant can be reduced in an effective manner.

In a simple embodiment, the supply device comprises at least one piston device for conveying gel-type propellant from the at least one tank to the combustion chamber.

It is favorable when the radiation of the at least one radiation impinging device is set with respect to frequency and/or intensity such that the temperature in the gel-type propellant can be increased. In the case of gels sensitive to temperature, an increase in temperature is generally linked to a reduction in the viscosity.

It may also be favorable when the radiation of the at least one radiation impinging device is set with respect to frequency and/or intensity such that the flow point in the gel-type propellant can be lowered. As a result, the conveying qualities of the propellant can be improved.

It can also be favorable when the radiation of the at least one radiation impinging device is set with respect to frequency and/or intensity such that bonds in the skeleton of the gel forming agent can be broken up. The viscosity can also be reduced in this way. This is advantageous, in particular, when the corresponding gel-type propellant has a low temperature sensitivity. Resonance frequencies in the gel can be excited by selectively setting the frequency in order to break up intermolecular bonds.

The at least one radiation impinging device comprises, in particular, at least one transmitter. The viscosity in the gel-type propellant can be reduced via the electromagnetic radiation radiated by the transmitter.

The at least one radiation impinging device radiates, in particular, in the microwave range, i.e., in a wavelength range of between approximately 1 mm and 30 cm (in the frequency range of 1 GHz to 30 GHz). As a result, the viscosity in the gel-type propellant can be reduced.

It is favorable when the gel-type propellant comprises one or more polar substances. Gel-type propellants are normally formed by way of gelation of a starting substance with gelling agent. The starting substance (the "actual" propellant) can, itself, be a polar substance or the gelling agent can comprise a polar substance or auxiliary agents with a polar character can be provided. In the case of gel-type propellants which comprise one or more polar substances, a high temperature sensitivity can, as a rule, be achieved, i.e., a reduction in viscosity during heating.

The invention is based, in addition, on the object of making a method available for conveying propellant in a drive device.

This object is accomplished in accordance with the invention in that the flow behavior of the propellant is influenced by a non-mechanical input of energy.

The method according to the invention has the advantages already explained in conjunction with the drive device according to the invention. The flow behavior of a propellant having Newtonian or non-Newtonian characteristics can be improved by the non-mechanical input of energy.

Additional, advantageous developments have likewise already been explained in conjunction with the drive device according to the invention.

The temperature in the, for example, gel-type propellant will, in particular, be increased by the non-mechanical input of energy. This can be brought about, for example, by thermal heating or by radiation impingement.

The shear viscosity and/or stain viscosity will be reduced, in particular, by the non-mechanical input of energy. As a result, good conveying properties may be achieved, in particular, with reduced conveying pressures.

It is favorable when the input of energy takes place by way of electromagnetic radiation. As a result, a large volume area can be acted upon in a contactless and direct manner in order to reduce the viscosity in this volume area. The impingement may be carried out quickly and within a short period of time and so the activation can be controlled. When the radiation is set accordingly, it is possible to excite specific frequencies in order to break up bonds in the skeleton of the gel forming agent.

For example, the input of energy takes place by way of microwave radiation in order to lower the viscosity.

It is favorable when a non-mechanical input of energy into the propellant takes place in a tank. As a result, the viscosity of propellant located in the tank may be reduced in order to make the conveyance of propellant from the tank to a combustion chamber easier in this way.

It may also be provided for a non-mechanical input of energy into the propellant to take place in a supply conduit from a tank to a combustion chamber. As a result, the conveyance of propellant in the supply conduit can be improved. In addition, it is possible to promote the atomization behavior and the vaporization behavior of the propellant positively during its coupling into the combustion chamber.

For the same reason, it is favorable when a non-mechanical input of energy into propellant takes place in an injection area for the injection of propellant into the combustion chamber.

The propellant is, in particular, a gel propellant. Propellant is, in this respect, to be understood generally as fuel and/or oxidizing agent.

The following description of preferred embodiments serves to explain the invention in greater detail in conjunction with the drawings.

DETAILED DESCRIPTION OF THE INVENTION

Figure 1:
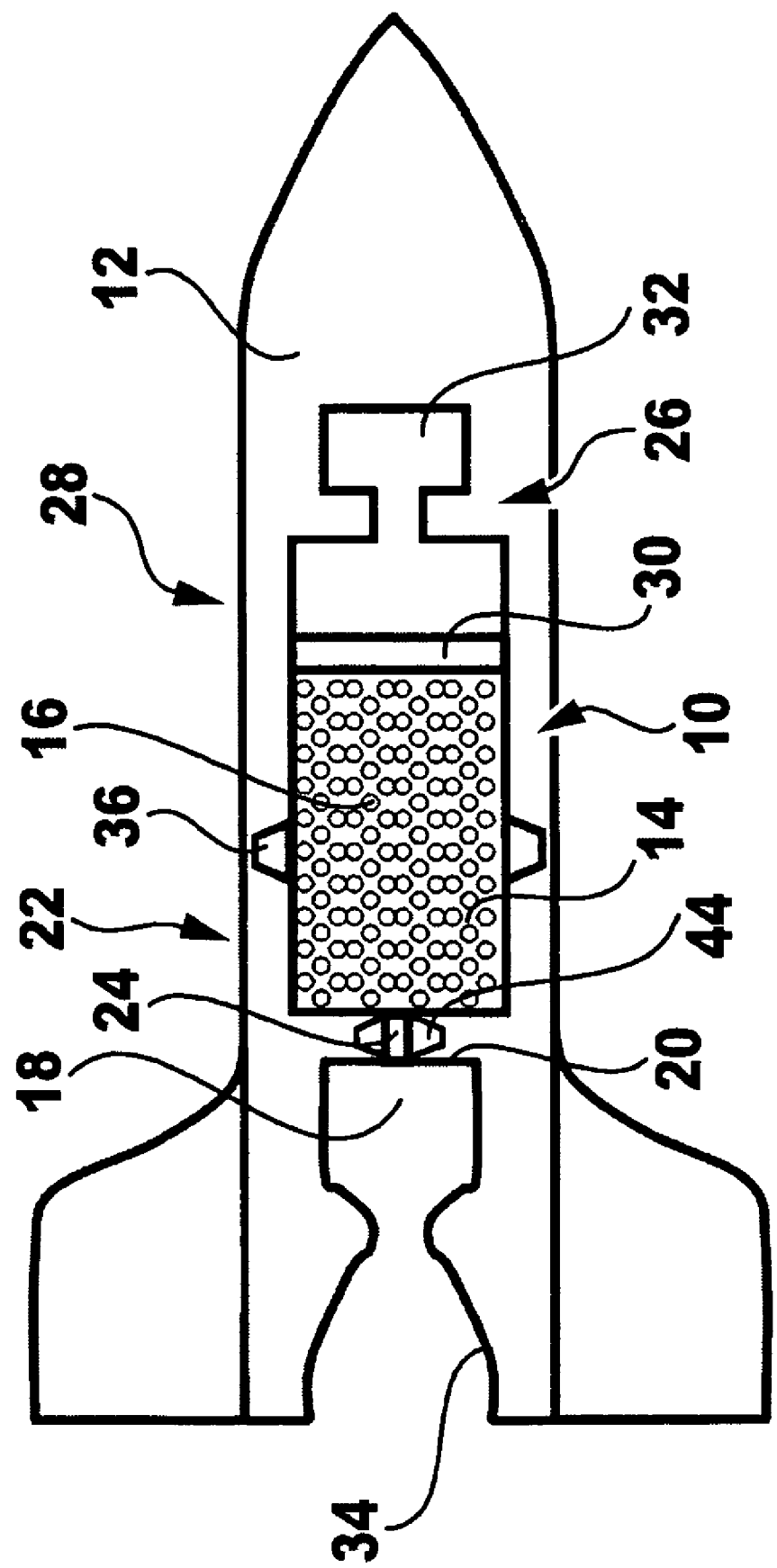
FIG. 1 shows a schematic illustration of a flying object with one embodiment of a drive device according to the invention.

One embodiment of a drive device according to the invention, which is shown schematically in FIG. 1 and designated as 10, is arranged on a flying object 12, such as, for example, a rocket.

The drive device 10, which is, in particular, a thrust generating device, is a gel drive device on the basis of gel-type propellant. The propellant can be the fuel and/or the oxidizing agent. The gel-type propellant can comprise a single propellant component (monopropellant) or it may be a composition of several propellant components (such as, for example, a bipropellant). The propellant may be monergol, biergol, triergol etc. or hypergol.

For the storage of the gel-type propellant, (at least) one tank 14 is provided, in which gel-type propellant 16 is accommodated. In the case of several propellant components, a corresponding number of tanks may be provided.

The drive device 10 comprises a combustion chamber 18, in which, when the fuel is gel-like, this gel-type propellant is fired with a supply of an oxidizing agent (where applicable, gel-like). An ignition device can be associated with the combustion chamber 18 (not shown in the drawings).

The combustion chamber 18 has an injection area 20, via which propellant can be injected into the combustion chamber 18. In addition, oxidizing agent can be injected into the combustion chamber 18 via the injection area 20.

The drive device 10 comprises a supply device designated as a whole as 22 for supplying propellant to the combustion chamber 18 via the injection area 20. This supply device 22 has one or several supply conduits 24 which are arranged between the (at least one) tank 14 and the injection area 20 of the combustion chamber 18.

The supply device 22 comprises, in addition, a conveying device 26 in order to transport the propellant from the tank 14 to the combustion chamber 18. For example, the conveying device 26 has a piston device 28 with a piston 30 movable in the tank 14. As a result of the piston 30, propellant can be pressed into the supply conduit 24 and pressed through the supply conduit 24 to the combustion chamber 18.

The piston 30 of the piston device 28 is driven by a drive 32.

A thrust nozzle 34 can be arranged behind the combustion chamber 18.

The drive device 10 operates with gel-type propellant; the drive device 10 is a gel engine.

A gel is a medium which has a colloidal, structural network which has a continuous matrix and permeates the liquid phase completely.

Engines with a controllable thrust can be made available on the basis of gel-type propellant. Small engines can, in particular, be built. Gel-type propellants behave like solid substances under normal ambient conditions and can, therefore, be stored and handled easily. They become flowable under pressure and the influence of shear stress; this enables a control of the throughput to be carried out, via which a control of the thrust is possible, on the other hand. In addition, gel-type propellants allow multiple ignitions in contrast to liquid propellants. Gel-type propellants may be handled relatively safely and a high insensibility, for example, with respect to leakage or impact may be achieved. Drive devices which are based on gel-type propellants have advantages of solid fuel drives and of hydraulic drives.

Gels are non-Newtonian fluids; the rheological behavior is dependent on shear rates and/or dependent on stain rates as well as being thixotropic.

In accordance with the invention, (at least one) radiation impinging device 36 and/or heating device is provided, via which the viscosity in gel-type propellant can be reduced in order to optimize the flow behavior of the gel-type propellant, in particular, with respect to conveyance and/or jet disintegration and/or vaporization and/or combustion.

An increase in the temperature in the gel-type propellant is brought about, in particular, via the radiation impinging device 36 and/or heating device for reducing the viscosity.

Figure 2:
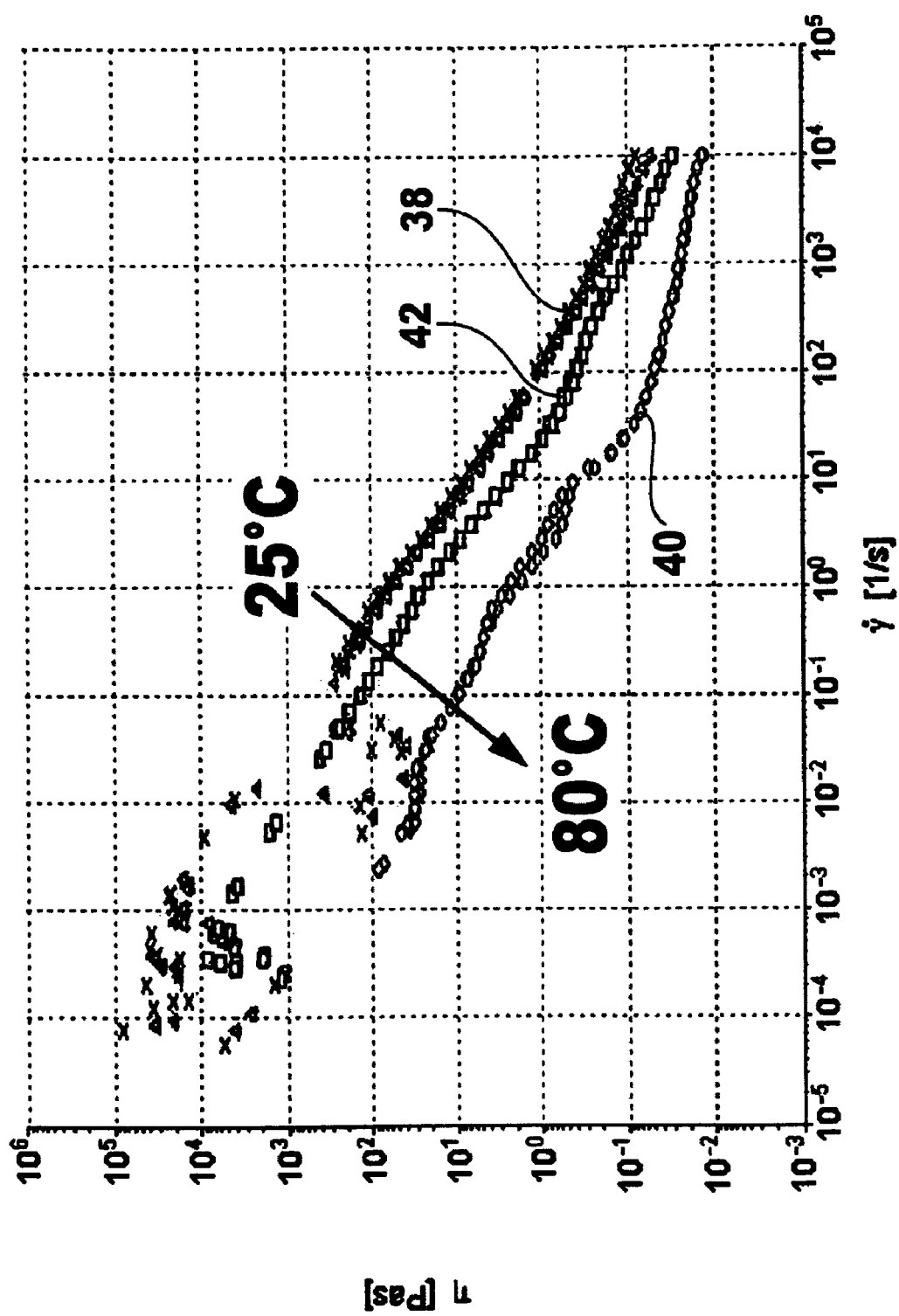
FIG. 2 shows the course of the dynamic shear viscosity $\eta$ over the shear rate $\dot{\gamma}$ of a paraffin gel at different temperatures.

In FIG. 2, the behavior of the dynamic shear viscosity $\eta$ over the shear rate $\dot{\gamma}$ is shown for an example of a gel-type propellant, namely paraffin gel. The paraffin gel is composed of paraffin, 7.5% thixatrol ST and 7.5% methyl isoamyl ketone (MIAK). The course of the dynamic shear viscosity is shown for various temperatures; the upper curve 38 shows the course at a temperature of 25° C., the lower curve 40 the course at a temperature of 80° C. and the central curve 42 the course at a temperature between these two temperatures. The shear thinning behavior of the gel is apparent first of all: The dynamic shear viscosity decreases with an increase in the shear rate $\dot{\gamma}$.

In addition, the influence of temperature on the dynamic shear viscosity is apparent: At higher temperatures and the same shear rate, the viscosity is lower.

The increase in temperature in the gel-type propellant may be brought about, for example, in that a microwave radiation impingement of the gel-type propellant in the tank 14 takes place via the radiation impinging device 36. For this purpose, the radiation impinging device 36 comprises a microwave transmitter which radiates, for example, microwave radiation with wavelengths in the range of approximately 12 mm (frequency of approximately 2.5 GHz).

In this respect, a volume area of the tank 14 is acted upon with radiation. The volume area can be the entire intake volume of the tank 14 or a part thereof.

It may also be provided for the supply conduit or supply conduits 24 to be acted upon by a radiation impinging device 44 and/or by a heating device in order to lower the viscosity of propellant conveyed therein.

For the same reason, it may be provided for the injection area 20 to be acted upon by radiation or heating to be provided.

The radiation impinging device 36 and 44, respectively, transmits electromagnetic radiation. As a result, it is possible to penetrate a large volume area in the gel-type propellant and, therefore, reduce the viscosity in a large volume area.

In principle, it is also possible for a heating device to act directly and thermally on the gel-type propellant or an induction heating may be provided.

An increase in temperature in the gel-type propellant can be brought about by way of radiation impingement or by thermal heating. In the case of gels sensitive to temperature, the viscosity (in particular, the shear viscosity and/or stain viscosity) may be reduced due to the resulting increase in temperature.

It is also possible for bonds in the gel forming agent skeleton of the propellant to be broken up as a result of the radiation impingement and/or, for example, direct, thermal heating. This likewise leads to a decrease in the viscosity. This mechanism is particularly relevant when the gel-type propellant has a low sensitivity to temperature.

It may be provided, in particular, for the radiation of the radiation impinging device 36 and 44, respectively, to be set with respect to frequency and/or intensity such that specific bonds are excited in a selective manner in order to break them up.

In accordance with the invention, a non-mechanical input of energy into the gel-type propellant takes place via radiation impingement and/or heating (for example, via direct thermal heating or by way of induction heating when the gel-type propellant can be heated in this way) from outside. This non-mechanical input of energy may be carried out in a contactless and direct manner via electromagnetic radiation. A large volume area of the gel-type propellant may be acted upon and, therefore, a large volume area heated. Bonds in the gel skeleton may be broken up by way of targeted excitation. Altogether, the viscosity may be reduced.

As a result, on the other hand, the resources for liquefying the gel via mechanical shear forces (FIG. 2) are reduced. As a result, the losses in conveying pressure are less. The conveying device 26 may be designed with less power. Moreover, the constructional resources are reduced since, for example, walls of the tank 14 can be designed to be less thick.

A saving on weight can be realized as a result of the reduction in viscosity according to the invention and the resulting reduction in conveying pressure. This leads in the case of the flying object 12 to a lower consumption of propellant or greater flight ranges.

It is, for example, also possible for a reduction in viscosity to take place via radiation impingement and/or direct, thermal heating at an injection area 20 during or immediately prior to an injection procedure. As a result, the preparation time for the start of the flying object 12 can be reduced.

The reduction in viscosity, in particular, via radiation impingement has the advantage that this can take place within a short time. The reduction in viscosity may be carried out, for example, directly prior to use or during the start and can also be carried out within short periods of time. This makes a high preparedness for use of the flying object 12 possible.

The flow point for certain gels may also be reduced as a result of an increase in temperature in a gel (for example, as a result of being acted upon with electromagnetic radiation or as a result of thermal heating). The flow point is that value or range of values for the shear stress, up to which a gel behaves like a solid substance. In order to cause gel to flow, the flow point must be exceeded.

Figure 3:
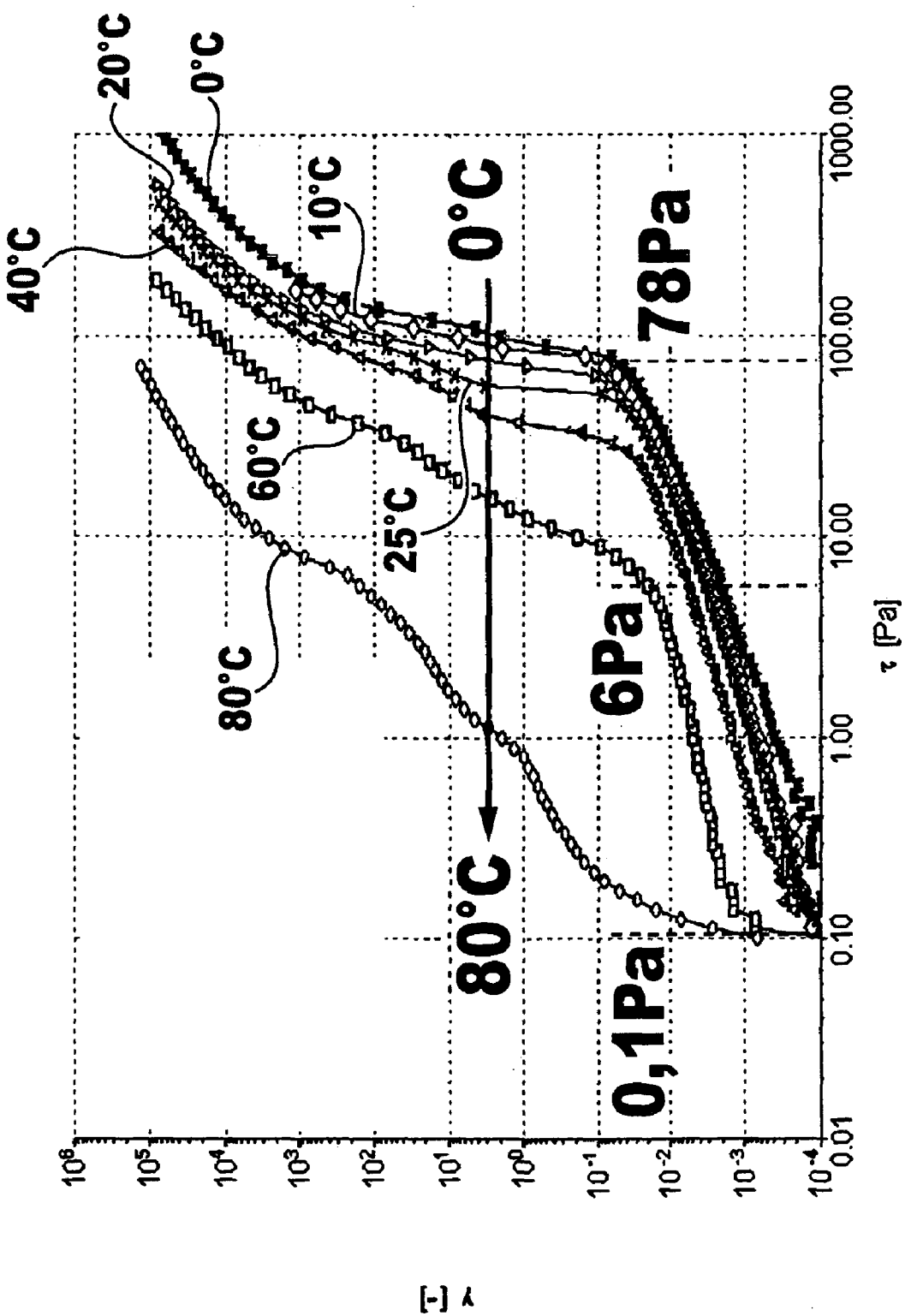
FIG. 3 shows the deformation $\gamma$ of a paraffin gel as a function of the shear stress $\tau$ applied for various temperatures (flow point) and FIG. 4 shows the temperature dependency of the viscosity of pure paraffin.

In FIG. 3, the deformation $\gamma$ for the above-mentioned paraffin gel is shown as a function of the shear stress $\tau$ applied for various temperatures. The temperature values are given at the respective curves. It is apparent that the flow point at 0° C. is at approximately 78 Pa whereas at 80° C. it is at approximately 0.1 Pa. The flow point of this gel (which is defined by the shear stress at the kink in the curve) is reduced as a result of an increase in temperature.

This means that the flow point for this gel is significantly reduced as a result of an increase in temperature. For this reason, as well, the flow properties in a gel-type propellant may be improved as a result of radiation impingement or direct heating.

Figure 4:
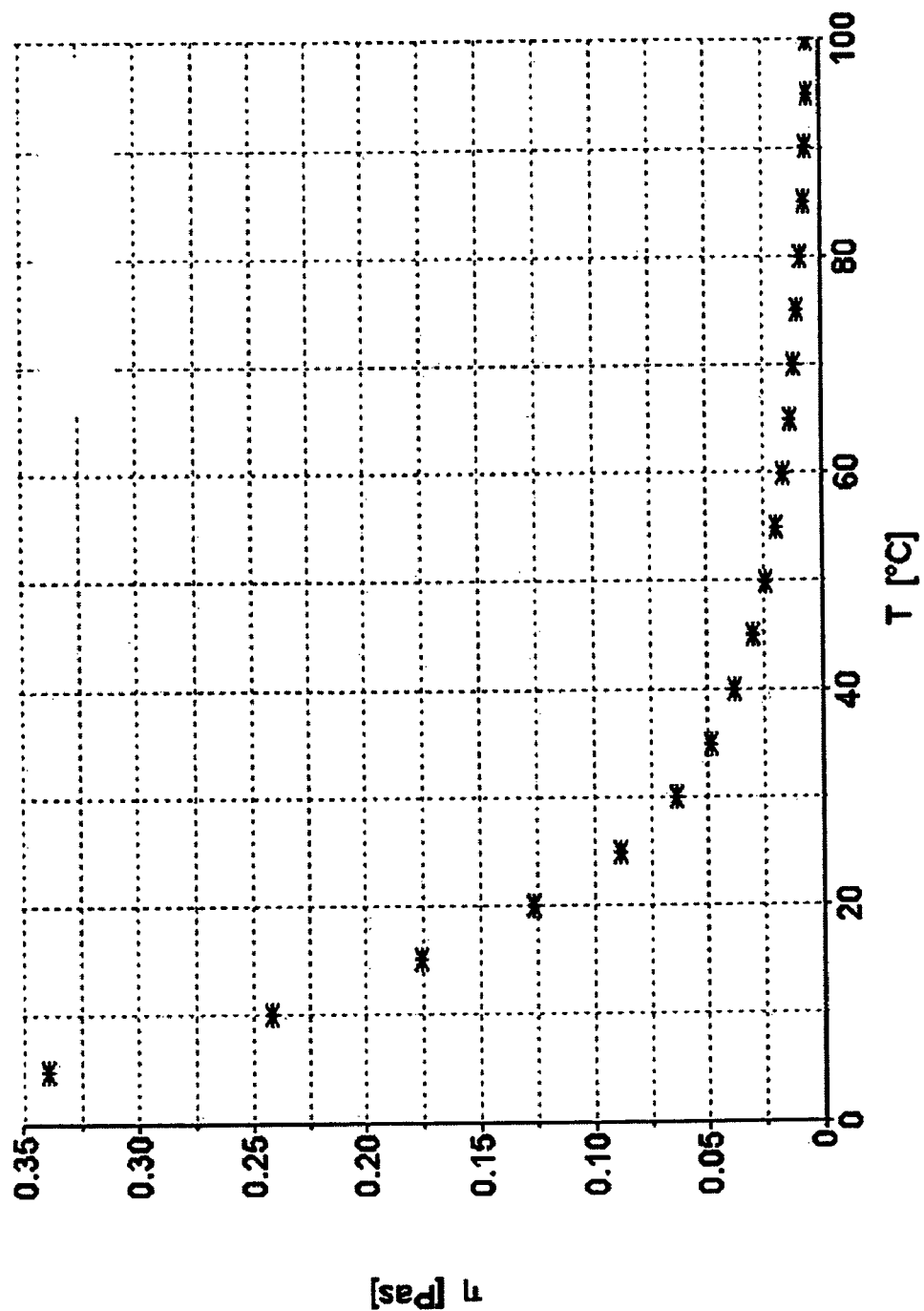

The basic substance of the above-mentioned paraffin gel is paraffin which is, in good approximation, a Newtonian fluid. The paraffin gel as gel-type propellant is brought about by gelation of the paraffin with a gelling agent. Liquid paraffin displays a considerable dependency of the viscosity $\eta$ on temperature (FIG. 4). The viscosity decreases with rising temperature.

This dependency on temperature of the viscosity of the basic substance of the gel also contributes to the fact that the viscosity of the gel decreases with an increase in temperature.

In accordance with the invention, a method for conveying propellant in a drive device (for example, on the basis of a propellant with non-Newtonian deformation and flow properties) is made available, with which the viscosity of the propellant is reduced by a non-mechanical input of energy. The non-mechanical input of energy takes place, in particular, by way of impingement with electromagnetic radiation.

The viscosity may be reduced essentially over the entire range of the shear rate. This reduction in viscosity is caused, in particular, by an increase in temperature. The flow point may also be lowered for certain gels. Altogether, the resources required for conveying the gel-type propellant may be reduced, whereby the overall mass of the flying object 12 can, on the other hand, be reduced.

In accordance with the invention, a drive device may be made available which can, in particular, be regulated. This drive device 10 or thrust generating device may be used in conjunction with flying objects 12, underwater rockets and the like. It may be used for hybrid rockets, with which only one component is gelled or used for ramjet engines. It may also be used in conjunction with thrust control engines, position control engines (which generate, for example, transverse thrust) etc. The method according to the invention can also be used in conjunction with solid cryogenic drives (slushed hydrogens etc.). For example, ejection seats can also be equipped with a corresponding drive device. Additional systems which require a variable thrust can also be equipped.

The energy for the radiation impingement and/or heating is made available by an energy generating device which can be integrated into the flying object 12 or be arranged externally. For example, the energy generating device is provided on a carrier for the flying object 12. This carrier can be stationary or mobile. In particular, the corresponding energy is coupled into the drive device 10 prior to the start in order to improve the flow behavior of the gel-type propellant for the start and for the flight phase following the start.

The invention claimed is:

1. Drive device on the basis of a gel-type propellant, comprising:
    at least one tank which stores and transports gel-type propellant;
    a combustion chamber;
    a supply device for supplying propellant to the combustion chamber from the tank; and
    at least one radiation impinging device arranged on the at least one tank for acting on the gel-type propellant with electromagnetic radiation in order to improve the flow behavior of the gel-type propellant from the at least one tank;
    wherein:
        the radiation of the at least one radiation impinging device is set with respect to at least one of frequency and intensity such that it is possible to lower a flow point in the gel-type propellant and to break up bonds in a gel forming agent skeleton of the gel-type propellant; and
        the at least one radiation impinging device radiates in the microwave range.

2. Drive device as defined in claim 1, wherein the at least one radiation impinging device is associated with one or several supply conduits from the at least one tank to the combustion chamber.

3. Drive device as defined in claim 1, wherein the at least one radiation impinging device is arranged at one or several supply conduits from the at least one tank to the combustion chamber.

4. Drive device as defined in claim 1, wherein the at least one radiation impinging device is associated with an area for injecting the propellant into the combustion chamber.

5. Drive device as defined in claim 1, wherein the at least one radiation impinging device is arranged at an area for injecting the propellant into the combustion chamber.

6. Drive device as defined in claim 1, wherein the at least one radiation impinging device is designed such that a volume area of the gel-type propellant is adapted to be acted upon with the electromagnetic radiation.

7. Drive device as defined in claim 1, wherein the supply device comprises at least one piston device for conveying the gel-type propellant from the at least one tank to the combustion chamber.

8. Drive device as defined in claim 1, wherein the radiation of the at least one radiation impinging device is set with respect to at least one of frequency and intensity such that it is possible to increase temperature in the gel-type propellant.

9. Drive device as defined in claim 1, wherein the at least one radiation impinging device comprises at least one transmitter.

10. Drive device as defined in claim 1, wherein the gel-type propellant comprises one or more polar substances.

* * * * *